United States Patent [19]

Miller et al.

[11] Patent Number: 5,468,462

[45] Date of Patent: Nov. 21, 1995

[54] GEOGRAPHICALLY DISTRIBUTED TRITIUM EXTRACTION PLANT AND PROCESS FOR PRODUCING DETRITIATED HEAVY WATER USING COMBINED ELECTROLYSIS AND CATALYTIC EXCHANGE PROCESSES

[75] Inventors: Alistair I. Miller, Ontario; Dino A. Spagnolo, Petawawa, both of Canada

[73] Assignee: Atomic Energy of Canada Limited, Ottawa, Canada

[21] Appl. No.: 161,395

[22] Filed: Dec. 6, 1993

[51] Int. Cl.[6] ................. C01B 5/00; C01B 4/00; B01J 8/00
[52] U.S. Cl. ................. 423/580.2; 423/647.7; 423/255; 204/129; 204/101; 204/237; 422/159; 422/234; 422/189
[58] Field of Search ................. 204/129, 242, 204/101, 128, 237; 423/580.2, 647.7, 255, 644; 422/159, 162, 234

[56] References Cited

U.S. PATENT DOCUMENTS

| | | | |
|---|---|---|---|
| 3,711,601 | 1/1973 | Reilly et al. | 423/64 |
| 4,054,496 | 10/1977 | Arrathoon | 204/12 |
| 4,173,620 | 11/1979 | Shimizu | 423/249 |
| 4,190,507 | 2/1980 | Hesky et al. | 204/12 |
| 4,190,515 | 2/1980 | Butler et al. | 204/266 |
| 4,497,775 | 2/1985 | McMullen et al. | 422/159 |
| 4,504,460 | 2/1985 | Mandrin | 423/58 |
| 4,533,539 | 8/1985 | Iniotakis et al. | 423/64 |
| 4,637,866 | 1/1987 | Konishi et al. | 204/12 |

FOREIGN PATENT DOCUMENTS

| | | |
|---|---|---|
| 615400 | 2/1961 | Canada . |
| 1046242 | 1/1979 | Canada . |
| 1079490 | 6/1980 | Canada . |
| 1126685 | 6/1982 | Canada . |
| 1160428 | 1/1984 | Canada . |
| 1311213 | 12/1992 | Canada . |
| 1463916 | 12/1966 | France ................. 423/580.2 |

OTHER PUBLICATIONS

R. S. Carlson–"The Uranium–Titanium System–The Storage of Tritium", Proceedings of the International Conference held at Gatlinburg, Tenn., 1975 Oct. 1–3 USAEC Conf–750989 vol. IV.

M. Damiani et al–"Tritium and Hydrogen Extraction Plants for Atomic Power Reactors", Sulzer Technical Review, Special Number Nuclex 72, pp. 41–44, 1972.

Allstair Miller–"Water and Hydrogen Detritiation–CECE process based on water–hydrogen isotopic exchange and electrolysis", Issue 22 Oct. 1993.

*Primary Examiner*—Kathryn Gorgos
*Attorney, Agent, or Firm*—Gowling, Strathy & Henderson

[57] ABSTRACT

A geographically distributed apparatus and process for detritiating heavy water is provided. The apparatus and process provide a remote site enrichment plant for producing an enriched stream of $DT/D_2$ gas and a hydriding unit for forming a hydride of the $DT/D_2$ gas for transportation. Pure tritium gas is produced at a local tritium extraction plant by reforming $DT/D_2$ in a de-hydriding unit and passing the gas mixture through a chain of cryogenic distillation columns. The invention provides a safe and cost-effective method of detritiating heavy water.

21 Claims, 6 Drawing Sheets

GEOGRAPHICALLY DISTRIBUTED TRITIUM EXTRACTION PLANT AND PROCESS FOR PRODUCING DETRITIATED HEAVY WATER USING COMBINED ELECTROLYSIS AND CATALYTIC EXCHANGE PROCESSES

FIELD OF THE INVENTION

The present invention relates to an apparatus and method for detrititation of nuclear reactors. The apparatus and process provide a remote site enrichment plant for producing an enriched stream of $DT/D_2$ gas and a hydriding unit for forming a hydride of the $DT/D_2$ gas. Production of a pure tritium gas stream is accomplished at a central site by de-hydriding the enriched gas and cryogenic distillation.

BACKGROUND OF THE INVENTION

The gradual accumulation of tritium in the heavy water of a CANDU (Canadian Deuterium Uranium) reactor is responsible for a substantial proportion of the radiological dose received by reactor operators. Tritium management is, therefore, becoming increasingly important as individual reactors require periodic detritiation.

For the scale of detritiation required to detritiate a CANDU reactor, cryogenic distillation of a mixture of hydrogen isotopes in the elemental form is the only applicable technology for concentration of the extracted tritium to near 100% purity. However, a tritium extraction plant (TEP) must first achieve a transfer of the tritium from the oxide form (DIO) to the elemental form (DT) for the distillation process.

Cryogenic distillation plants are expensive, with the cost of these plants scale insensitive to the volume of heavy water treated. Thus, there has been a need for a geographically centralized process to effect tritium extraction in order to reduce the need for individual tritium extraction and cryogenic distillation plants to be built for various reactors. The drawback of centralized tritium extraction, however, is shipping tritiated heavy water by conventional tanker and the public controversy that develops over the perceived threat of a spill. This perceived threat has resulted in severe restraints of the shipping of heavy water from the United States to Canada. Another drawback is that the cost effectiveness of centralized detritiation is affected by the quantity and value of heavy water that would be in transit at a given time between the centralized tritium extraction plant and the reactor site, especially as the distance between the TEP and the reactor site is increased.

The cost effectiveness of shipping tritiated heavy water is also affected by the degree of detritiation. A high level of detritiation is particularly desirable where deuterium has to be shipped over extensive distances and where the detritiated product has to be returned in water form.

Prior Art

The technology of removing tritium from heavy water is described by Holtslander et al in Fusion Engineering and Design 12 (1990) 357–363 as a combination of Liquid Phase Catalytic Exchange (LPCE) and Cryogenic Distillation (CD). The Chalk River Tritium Extraction Plant enables the transfer from the DTO form in the water stream to the DT form in deuterium gas by a catalyzed isotopic exchange process called Liquid Phase Catalytic Exchange process. This reaction is as follows:

$$DTO + D_2 \rightleftharpoons D_2O + DT$$

This is the front end of the process and is carried out in a column packed with hydrophobic catalyst with counter-current flows of heavy water and deuterium gas. Tritium and deuterium are then separated by low temperature distillation of the liquified $D_2$-DT mixture in a train of cryogenic distillation columns. The tritium-lean $D_2$ stream is returned to the front end catalytic column and the $T_2$ product is removed from the end of the distillation train and packaged for storage.

U.S. Pat. No. 4,173,620 discloses a method of extracting tritium from tritium containing heavy water. The method involves feeding tritium containing heavy water into an exchange reaction column where the heavy water is brought into contact with a tritium-containing heavy hydrogen to thereby transfer tritium in the heavy hydrogen into the heavy water by way of the exchange reaction to obtain a tritium-enriched heavy water. The resulting tritium-enriched heavy water is fed into an electrolytic cell to generate a tritium-enriched heavy hydrogen. Tritium gas is extracted from a hot-wire type thermal diffusion cascade.

U.S. Pat. No. 4,190,515 discloses a method and apparatus for removing tritium from heavy water and light water. This patent discloses contacting a tritiated feed water in a catalyst column with a hydrophobic, wet-proofed catalyst, with a countercurrent flow with hydrogen gas from an electrolytic cell. Tritium enriched water is passed to an electrolytic cell to generate the electrolytic hydrogen gas. The tritium content of the hydrogen gas leaving the top of the enricher catalyst column is further reduced in a stripper column containing catalyst which transfers the tritium to a countercurrent flow of liquid water.

Canadian Patent 1,137,025 discloses a process for the extraction of tritium from a liquid heavy water stream. This process involves contacting the liquid heavy water with a countercurrent gaseous deuterium stream in a column packed with a catalyst such that tritium is transferred by isotopic exchange from the liquid heavy water stream to the gaseous deuterium stream, passing the gas enriched in tritium born the column through means for removing tritium therefrom and returning the gas lean in tritium to the column, taking a portion of the liquid heavy water stream after it leaves the column and passing it through an electrolysis stage to produce a gaseous deuterium output which is returned to the column and a gaseous oxygen output that is sent to waste or to other uses, obtaining the remaining fraction of the liquid heavy water output from the column, the heavy water thus reduced in tritium content.

SUMMARY OF THE INVENTION

In accordance with the invention, an apparatus for detritiating heavy water is disclosed comprising:
 a remote site enrichment plant for producing an enriched stream of $DT/D_2$ gas; and
 a hydriding unit for forming a hydride of said $DT/D_2$ gas for transportation.

Another aspect of the invention provides an apparatus for producing tritium gas comprising a de-hydriding unit for re-forming tritium enriched $DT/D_2$ gas at a central site from a hydride of enriched $DT/D_2$ gas and a cryogenic distillation plant for producing tritium gas from the enriched $DT/D_2$ gas.

The invention also provides a process for detritiating heavy water comprising the steps of:
 a) producing a tritium enriched $DT/D_2$ gas mixture and a tritium lean $DT/D_2$ gas mixture from a feed of tritium rich heavy water at a remote site by a remote site enrichment process;

b) forming a hydride of said tritium enriched $DT/D_2$ gas mixture; and, c) forming tritium lean heavy water from said tritium lean $DT/D_2$ gas mixture.

Another aspect of the invention provides a process for detritiating heavy water comprising the steps of:

a) reforming a tritium enriched $DT/D_2$ gas mixture in a de-hydriding unit from a hydride of enriched $DT/D_2$ gas; and, b) producing a tritium gas stream from said tritium enriched $DT/D_2$ gas mixture by a central cryogenic-distillation process.

Another aspect of the invention provides a system for detritiating heavy water comprising:

a remote site enrichment plant for producing an enriched stream of $DT/D_2$ gas from a tritium rich heavy water feed;

a hydriding unit at the remote site for forming a hydride of said $DT/D_2$ gas for transportation to a central site;

a de-hydriding unit at the central site for re-forming said $DT/D_2$ gas;

a cryogenic distillation plant for forming a tritium gas stream at a central site; and, a central site enrichment plant for producing an enriched stream of $DT/D_2$ gas for the cryogenic distillation plant and tritium lean heavy water for return to the remote site.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
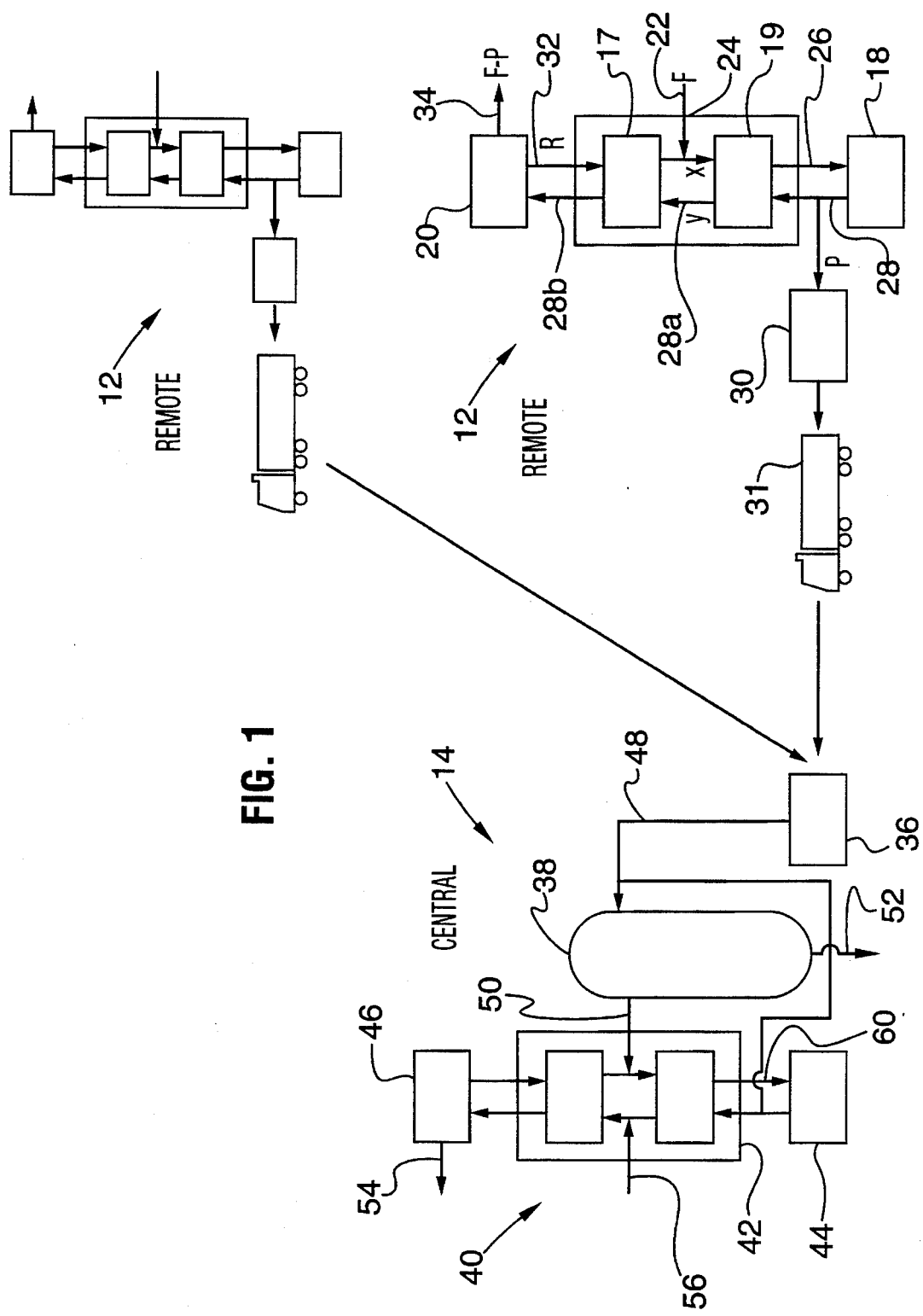
FIG. 1 is a schematic diagram of a geographically distributed tritium extraction process.
Figure 2:
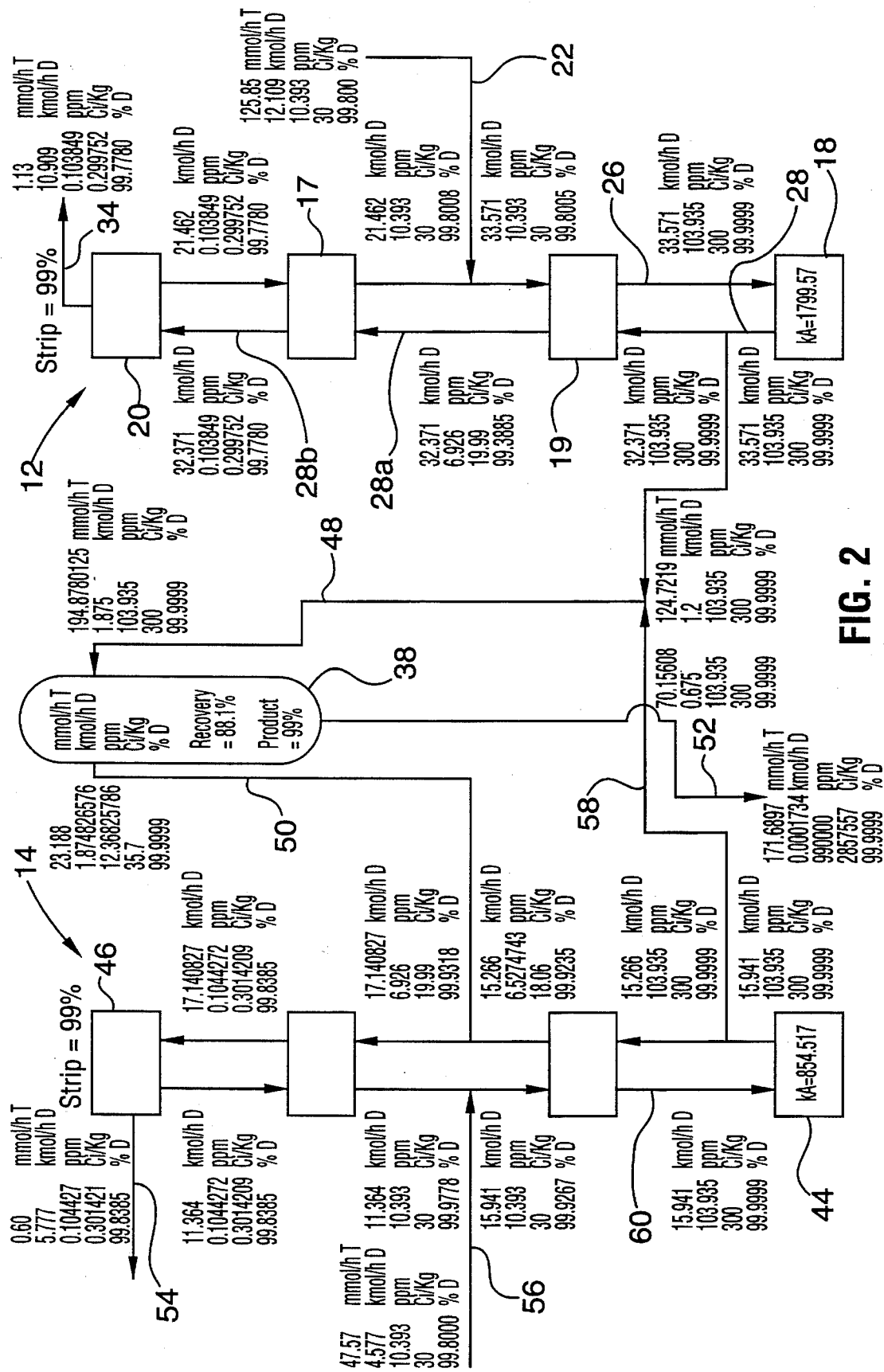
FIG. 2 shows a computer spreadsheet model of a typical operating case with electrolysis split approximately 1:2 between the central and remote sites and 10-fold gas pre-enrichment (Case 1)
Figure 3:
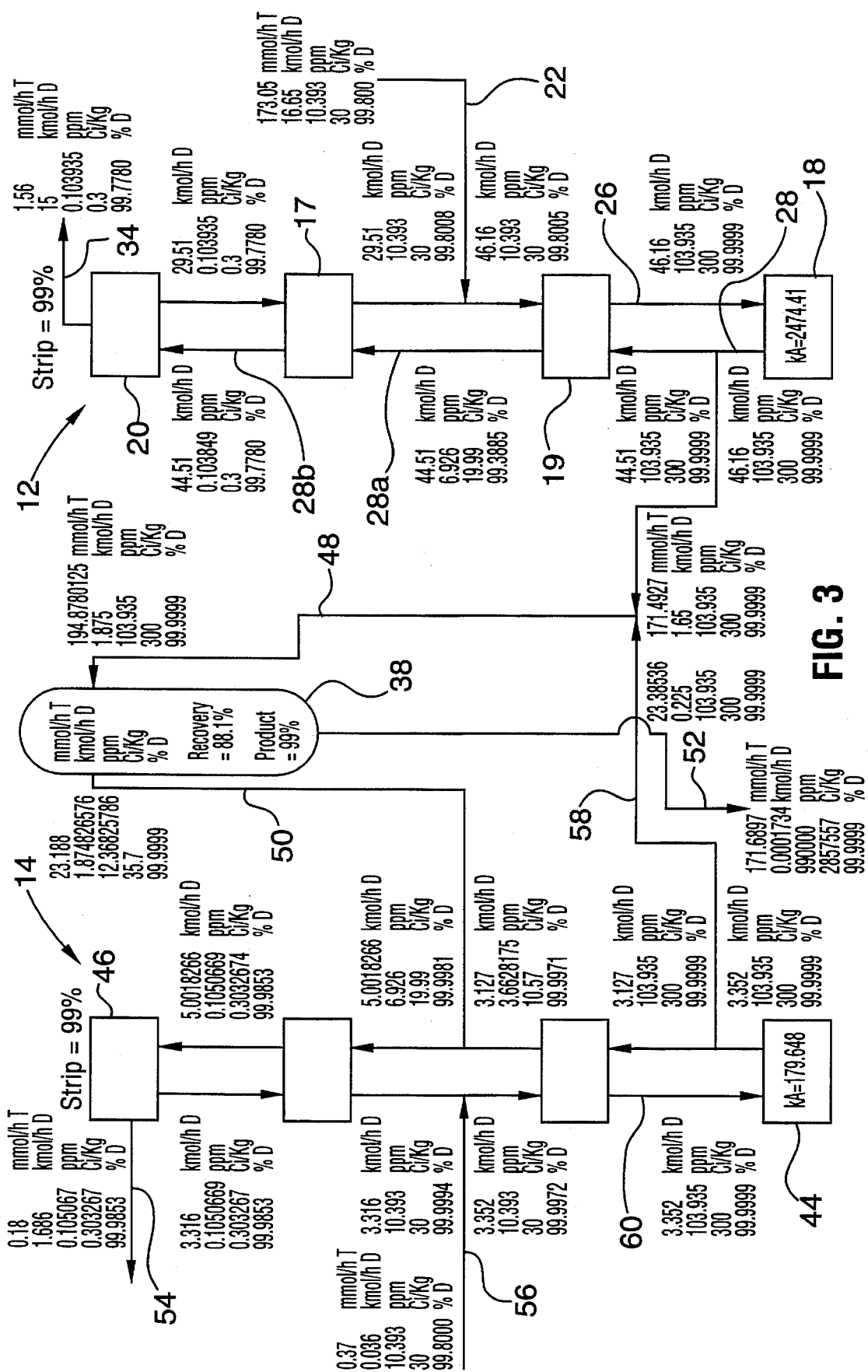
FIG. 3 shows a computer spreadsheet model of an extreme operating case with almost zero central feed processing and 10-fold gas pre-enrichment (Case 2)
Figure 4:
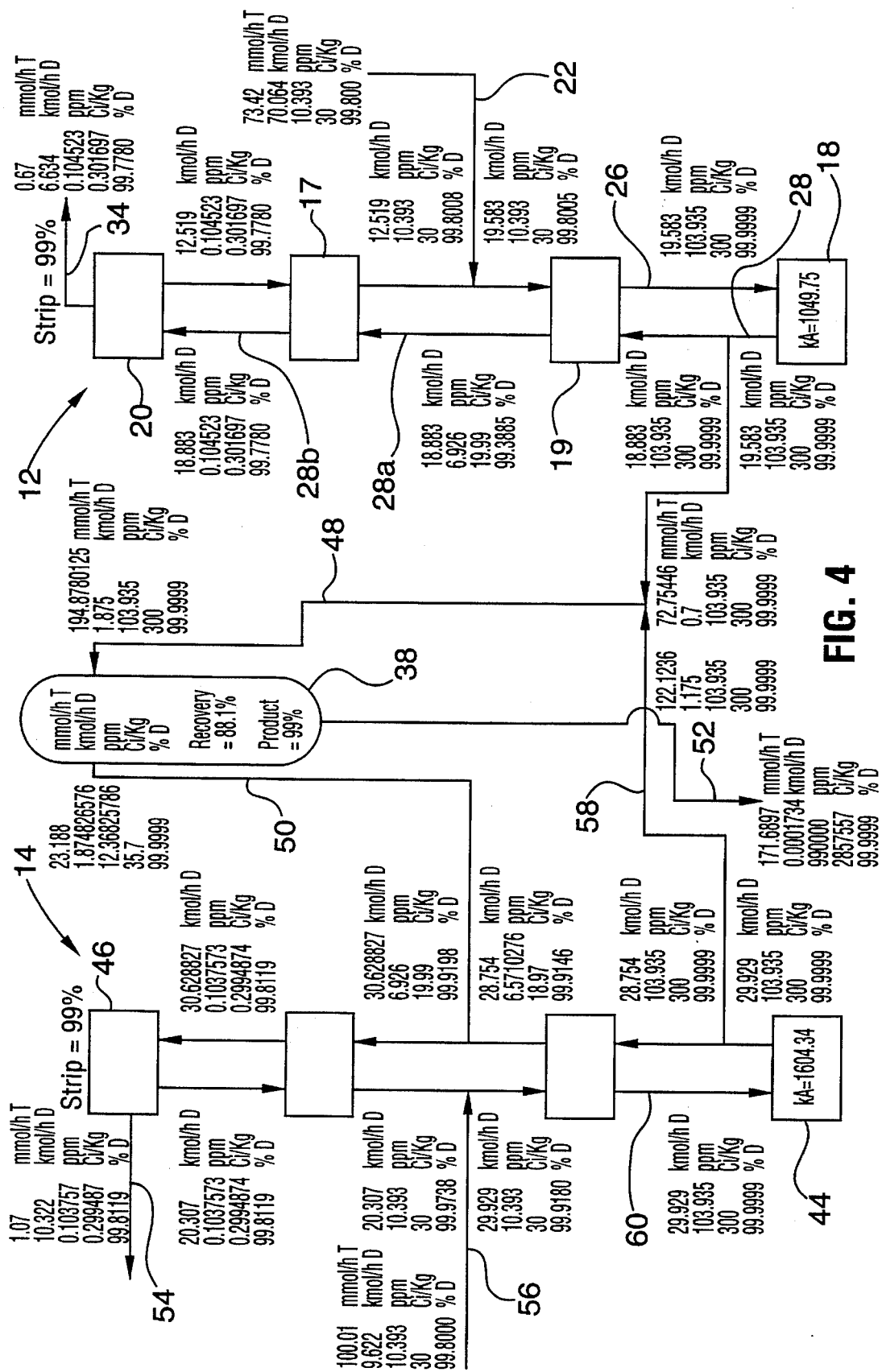
FIG. 4 shows a computer spreadsheet model of a typical operating case with electrolysis split approximately 3:2 between the central and remote sites and 10-fold gas pre-enrichment (Case 3)
Figure 5:
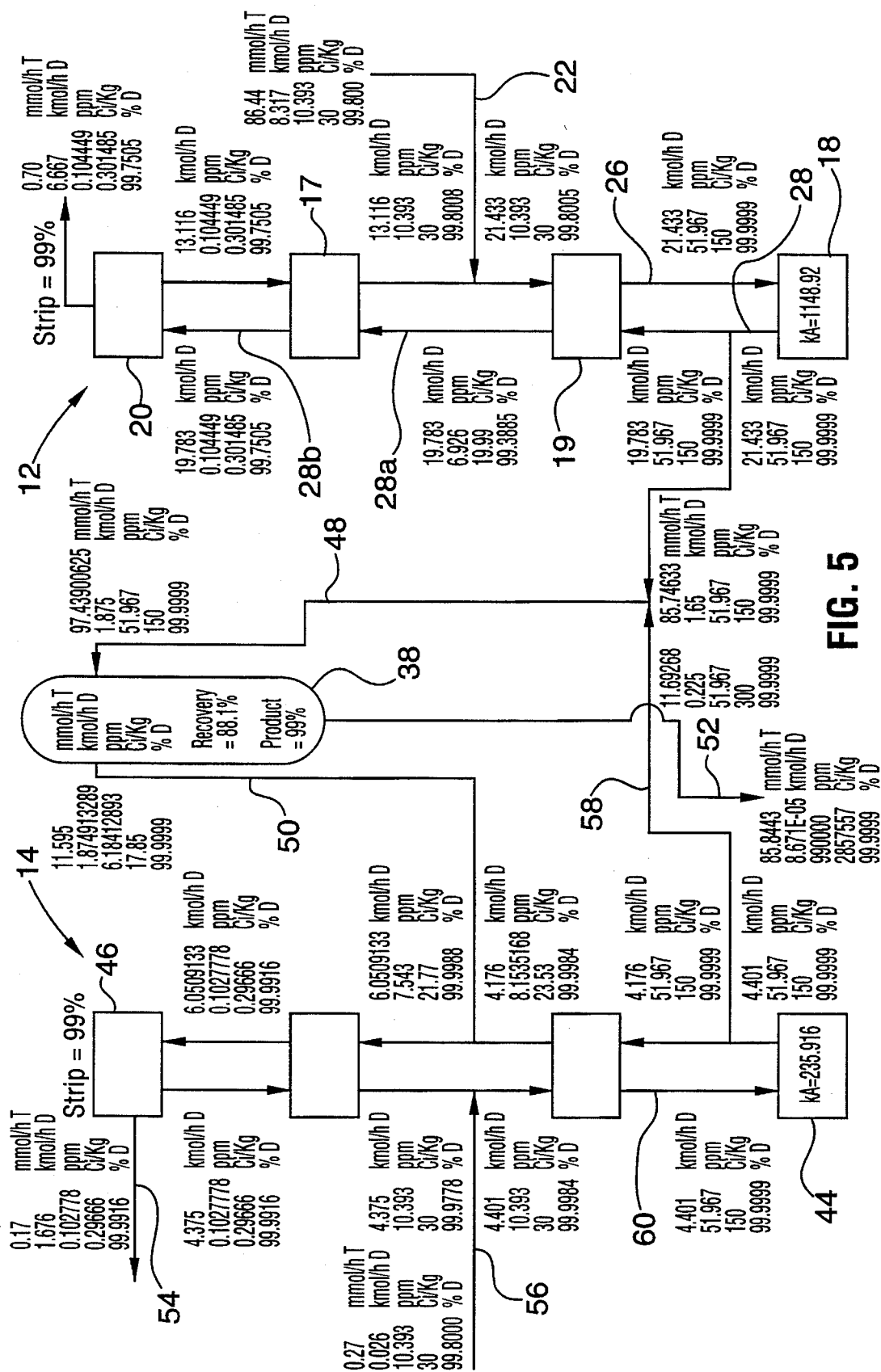
FIG. 5 shows a computer spreadsheet model of a typical operating case with halved throughput and 5-fold gas pre-enrichment (Case 4); and, FIG. 6 shows a computer spreadsheet model of a typical operating case with one-third throughput and 3.33-fold gas pre-enrichment (Case 6).
Figure 6:
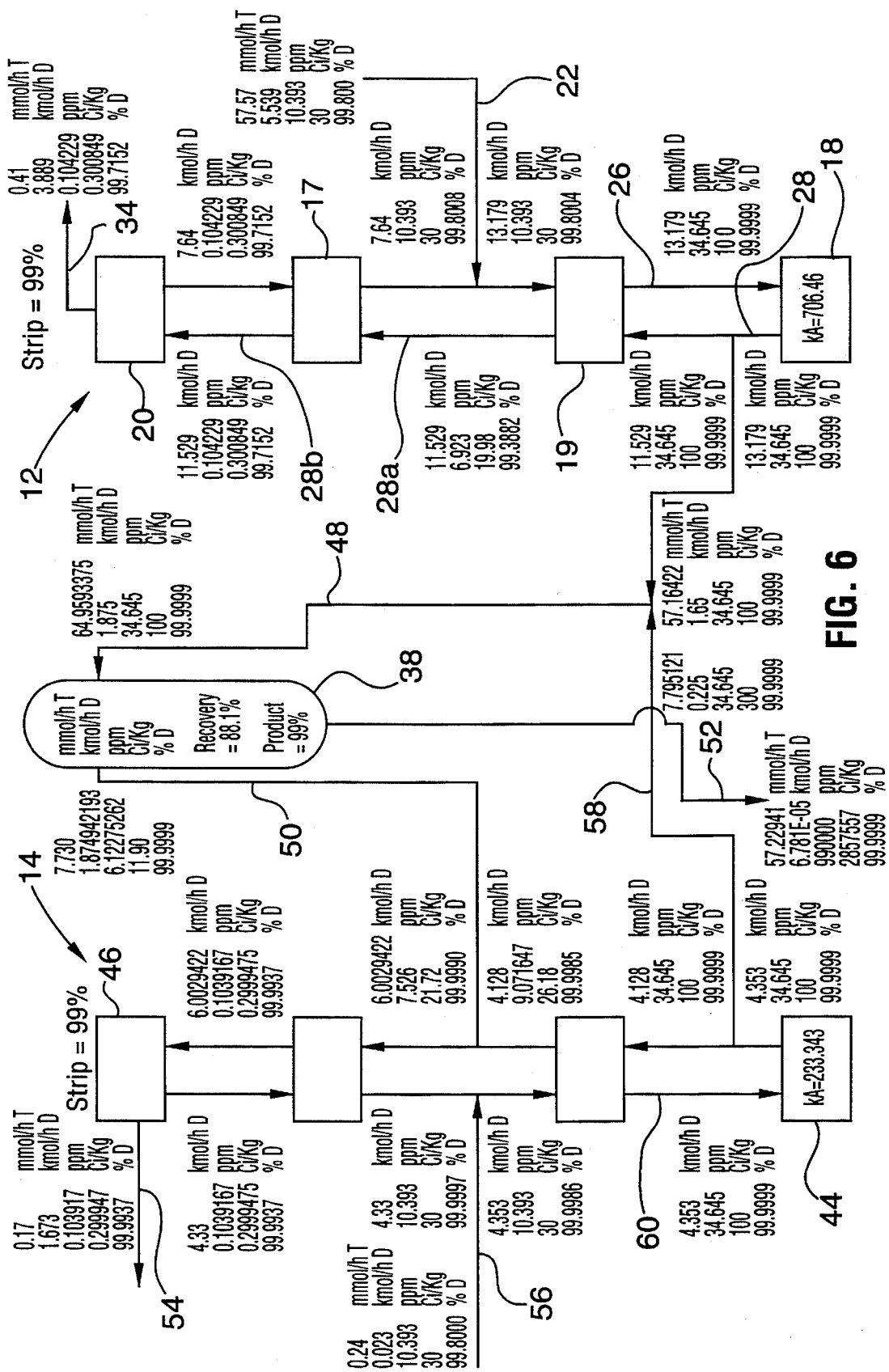

FIG. 1 is a schematic diagram of a geographically distributed tritium extraction process in accordance with the invention. FIGS. 2–6 are operating examples of the process from a computer spreadsheet model.

Combined Electrolysis and Catalytic Exchange Units (CECE) 12 are provided at geographically remote sites from a Tritium Extraction Plant (TEP) 14. The remote CECE 12 is provided with an isotope exchange column 16 with stripping section 17 and enriching section 19, electrolysis unit 18, and recombiner unit 20. Feed water 22, typically comprising $DTO/D_2O$ at around 10–30 Ci/kg tritium, enters the isotope exchange column 16 at a feed point 24. The isotope exchange column 16 is a countercurrent column that exchanges elemental tritium in DT gas with elemental deuterium in DTO over a wetproofed catalyst. Details of the wetproofed catalyst are described in Canadian Patent 907292 and by our colleagues W. A. Seddon et al in their article "Wetproofed catalysts: a new effective solution for hydrogen isotope separation and hydrogen oxygen recombination", Proc. ADME Energy Sources Technology Conf. and Exhibition (84-PET-11), New Orleans, La. (1984).

Below the feed point 24, the tritium content in the water ($DTO/D_2O$) is enriched in the isotope exchange column 16 by countercurrent flow of $DT/D_2$ gas. Water stream 26 exiting the isotope exchange column 16 is fed to electrolysis unit 18 to produce $DT/D_2$ gas and $O_2$ gas at the cathode and anode of the electrolysis unit 18 respectively. The $DT/D_2$ gas stream 28 is split into two streams; one stream is absorbed on an appropriate metal to form a hydride 30 at a tritium concentration typically up to the equivalent of 300 Ci/kg as heavy water (about 100 ppm); the second stream is fed to the lower end of the isotope exchange column 16 as a countercurrent flow 28a against the $DTO/D_2O$ liquid stream. The $DT/D_2$ gas stream 28b exiting the top of the isotope exchange column 16 is lean in tritium. The $DT/D_2$ exit stream 28b is fed to the recombiner unit 20, where the $DT/D_2$ gas is combined with oxygen to produce $DTO/D_2O$ liquid stream. The recombined $DTO/D_2O$ stream leaving the recombiner unit 20 is depleted in tritium, typically to about 0.01 Ci/kg. It is split into two streams; stream 34 is a tritium-depleted product stream (returned to the source of the plant's tritiated feed); stream 32 is fed to the top of the isotope exchange column 16 to provide reflux for tritium enrichment.

Above the feed point 24, tritium can be stripped to any desired level, the degree of stripping varies with the height of the isotope exchange stripping column 17 above the feed point 24. Tritium content approaching that of virgin heavy water can be produced.

The isotope exchange process is driven by the separation factor between water and hydrogen. At 25° C., the separation factor is 3.80 for D/H, 1.67 for T/D and 6.35 for T/H. The isotope exchange process is favoured by a high separation factor since the transfer of isotopes is from gas to liquid. Of the possible applications to separate the three isotopes of hydrogen, the process works the most favourably for tritium-protium separation and least well for tritium-deuterium separation. In practical terms, the separation factor is important for its impact on the ratio of feed to reflux flows for the CECE exchange column 16. For example, FIG. 2 indicates that the ratio of tritium concentrations between the liquid leaving and the gas entering the stripping section 17 of the CECE exchange column is 1.50. There is essentially zero tritium at the top of this section, so the liquid out and gas in at the bottom of this section carry effectively equal total flows of tritium. If the internal reflux flows were smaller, the ratio of concentrations between them would become larger and would become impossible when the ratio exceeded the separation factor value of 1.67 (since this is essentially in pure $D_2O$). In reality, it actually needs to be somewhat less than 1.67 to keep the column lengths within reason, hence the choice of a value close to 1.5. This effectively sets the ratio of the reflux to feed flow. Referring to FIG. 1, where "x" and "y" are tritium concentrations and F, R, and P are flows of feed, reflux and product respectively, if the concentration of tritium at the recombiner is close to zero, then:

$$(R+F-P)y=Rx$$

Since y has to be greater than $x/\alpha$ (where the separation factor, $\alpha=x/y$ at equilibrium) to cause tritium to flow from the gas to the liquid, it follows that $$(R+F-P)/R>\alpha \text{ which rearranges to: } R/(F-P)>1/(\alpha-1)$$

The quantity of water that can be processed with a CECE configuration is controlled by the electrolysis capacity. The feed of heavy water for detritiation is typically about one-third of the total quantity electrolysed. The electrolysis capacity that can be designed into a TEP system, and hence, the volume of feed that can be processed, is proportional to the concentration of tritium that is acceptable in the electrolysis cells. Thus, in FIG. 3 where the tritium concentration of water entering the electrolysis cell 18 is 300 Ci/kg, the throughput of feed is three-times higher than that in FIG. 6 where this concentration is 100 Ci/kg.

The metal hydride 30, enriched in tritium relative to the concentration of tritium in the feed water 22, is then shipped to the central TEP 14 via conventional shipping means 31. Shipping the $DT/D_2$ gas as a hydride may be conducted on any suitable metal such as uranium. In the case of uranium, it is preferably loaded to around $UD_{2.8}$ (the stoichiometric ratio is $UD_3$).

This method of shipping tritium has several advantages over shipping tritium in other forms including the following: In its elemental form, tritium is about 10,000 fold less radio-toxic than the oxide form in heavy water; the choice of a suitable hydride reduces the risk of a release of an accidental nature while in transit; and, most of the heavy water that is detritiated does not leave the reactor site resulting in lower quantities of heavy water tied up in transit which enables a reactor to have a lower heavy water inventory.

A number of metals and alloys have the capacity to reversibly absorb hydrogen at ambient temperature and pressure. As the process is reversible, there will always be some residual partial pressure of hydrogen in equilibrium with the absorbed hydrogen, but in practice, many metals have minute partial pressures at ambient conditions. As the temperature rises, the partial pressure of the free hydrogen in equilibrium with the metal hydride rises and the hydrogen can be recovered by pumping it away from the metal. With uranium, pressures exceeding atmospheric occur at moderate temperatures (above approximately 400° C.) making it a good material for reversible storage. Storage of tritium as a hydride is explained more fully in the paper by Carlson, R. S. "The Uranium-Titanium System—The Storage of Tritium", Proceedings of the International Conference held at Gatlinburg, Tenn., 1975 October 1–3 USAEC CONF-750989 Volume IV.

The central tritium extraction plant 14 comprises a de-hydriding unit 36, a cryogenic distillation unit 38 and a CECE unit 40 with central isotope exchange column 42, central electrolysis unit 44 and central recombiner unit 46.

At the central tritium extraction plant 14, the $DT/D_2$ hydride is processed by a combination of heating and compression of the released gas to slightly above ambient pressure in the de-hydriding unit 36 to reform $DT/D_2$ gas as a central $DT/D_2$ gas stream 48. This stream is passed through a train of cryogenic distillation columns in the cryogenic distillation unit 38 which separate the liquified $D_2$-DT mixture into tritium pure 52 and tritium lean streams 50. An example of the design of the cryogenic distillation plant is described in the paper by M. Darniani et al "Tritium and Hydrogen Extraction Plants for Atomic Power Reactors", Sulzer Technical Review, Special Number Nuclex 72, pp 41–44, 1972. The tritium-lean $D_2$ stream 50 is fed to the central isotope exchange Column 42 and the $T_2$ product 52 is removed from the end of the distillation train and packaged for storage.

The tritium lean $D_2$-DT stream 50 is processed in the central CECE unit in the manner described above for the remote site CECE unit 12. Central CECE treatment enables the deuterium gas to be reformed as tritium depleted heavy water and enables optional processing of a central feed of tritiated water 56. A portion of the tritium depleted DTO/$D_2O$ product 54 is returned to the remote reactors as heavy water with a very low tritium activity, typically less than 1 Ci/kg. The remaining portion of the tritium depleted product is passed through the central isotope exchange column 42 and the central electrolysis unit 44. A portion of the electrolysed stream ($DT/D_2$ gas) 58 is returned to the C-D unit 38 and the remaining portion 60 is returned to the central isotope exchange column 42.

Shipping of the tritium depleted heavy water product 54 may be returned to the remote reactors by conventional shipping means used for shipping heavy water.

In addition, a central feed 56 of tritiated heavy water 56 may be introduced into the central isotope exchange column 42 and stripped of tritium in the manner described above for the remote site CECE.

Operation

Remote CECE units can provide high levels of tritium removal and enough pre-enrichment to match the capacity of the central C-D unit to the whole system's processing needs. A small amount of the CECE capacity (electrolysis, recombiners and exchange columns) should be provided at the central tritium extraction plant 14 to enable tritium extraction to greater than the detritiation level (typically in the range of 80 to 97%) that would be achieved by the cryogenic distillation column 38. The remote site or sites can deploy up to 93% of the CECE capacity, (remote and central) and can process up to 100% of the heavy water feed stream capacity. Recovery in percentage terms does not vary with feed concentration in the C-D unit but the capacity of the C-D unit varies with the tritium concentration entering it.

The overall concept of the invention is very flexible with a wide range of process variables and options. The selection of some variables for the process is arbitrary depending upon the desired level of detritiation. The extent of detritiation is adjustable at the design stage. For example, a level of 99% detritiation of the feed water may be chosen. Different CECE sites could have different levels of detritiation though they would have to deliver approximately the same tritium concentration in the deuterium gas to the central tritium extraction plant 14. By way of example, the pre-enrichment process at the remote CECE unit 12 may provide a 10 fold enrichment of tritium concentration above the feed water 22 tritium concentration.

It is also arbitrary that a feed concentration of 10–30 Ci/kg is chosen as the level at which an individual reactor decides to initiate tritium reduction may vary. Feed concentrations of 1–50 Ci/kg may also be chosen.

From the vantage point of the entire system, the situation becomes more complicated if the tritium concentration arriving from different reactors is not at the same level.

Thus, if Reactor A wishes to maintain 10 Ci/kg moderator water while Reactor B wishes to maintain 30 Ci/kg moderator water, the CECE processing Reactor A's water should provide a greater level of pre-enrichment by using a longer isotope exchange column. Moderate mismatches between streams feeding the C-D from different remote sites would be acceptable whereas large mismatches would be inefficient but could be tolerated.

There are two approaches to coolant detritiation by either detritiating the coolant directly or by flushing tritium from the coolant by displacing it with highly detritiated moderator water. Either approach could be used with this concept, since the extent of detritiation is effectively unbounded. However, if coolant is to be detritiated separately, in order to reach the overall system's C-D feed concentration, the enrichment section of the CECE will have to be much longer. As it is unlikely that a very high level of detritiation will be required for coolant water, this could easily be arranged by changing the feed location to raise the CECE's enrichment and lower its extraction. If a high extraction is needed, a greater length of CECE columns is perfectly practicable.

Overview of Process Variables

A spreadsheet model was created to provide an overview of possible combinations of operating variables. While this model does not include a detailed calculation of the CECE exchange tower, cases can be made comparable by maintaining the same degree of pinch for D/T separation at the bottom of the upper stripping sections (i.e. by "pinch" is meant the proportionate closeness to equilibrium between the tritium concentration in the gas phase and in the liquid phase. Thus, where deuterium gas is in equilibrium with heavy water when the concentrations are in the ratio of 1:1.67, a 99% pinch would have these two concentrations in the ratio (1/0.99):1.67)).

The model shows cases of typical flows (kmol/h), tritium concentrations (ppm and Ci/kg) and deuterium concentrations (% D). The CECE columns assume a temperature of 25° C. The capacity of the electrolytic cells are given in kA. The cryogenic distillation unit assumes a recovery of 88.1% and product of 99%. Tritium flow is given in mmol/h.

The cases in FIGS. 2 to 6 (Cases 1–6) are summarized in Table 1. All assume the design flow to the central cryogenic distillation plant of 1.875 kmol/h, 88.1% cryogenic stripping of tritium and 99% CECE stripping of tritium from the water feed streams. A base of 30 Ci/kg (10.39 ppm) was used for the feed. Operation for 70% of the time is assumed (6132 h/a). The values indicated here are all strictly exemplary values.

Cases 1 to 3 are typical of the continuum of cases with deuterium gas enriched 10 fold over the water feed concentration of tritium. The water feed could be distributed in any way from 100% remotely to no remote processing whatsoever. A preponderance of remote processing seems likely but, even with totally remote feed, some electrolysis is required at the central cryogenic distillation plant to further strip the tritium content of the deuterium gas returned from the C-D plant.

Cases 4 and 5 are representative of a smaller total system, where enrichment of the C-D feed exceeds that of the water feed by only a factor of 5 and 3.33, respectively.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

TABLE 1

| | Summary of Spreadsheet Analyses | | | | | | | | | | |
|---|---|---|---|---|---|---|---|---|---|---|---|
| | Central (kmol/h unless otherwise stated) | | | | Remote (kmol/h unless otherwise stated) | | | | Enrich. to C-D (x) | Total Elect. (kA) | Water processed (Mg/a) | |
| Case | Feed | Reflux | To C-D | E-cell (kA) | Feed | Reflux | To C-D | E-cell (kA) | | | At CRL | Remote |
| 1 | 4.577 | 11.36 | 0.68 | 855 | 12.11 | 21.46 | 1.20 | 1800 | 10 | 2654 | 561 | 1485 |
| 2 | 0.036 | 3.32 | 0.23 | 180 | 16.65 | 29.51 | 1.65 | 2474 | 10 | 2654 | 4 | 2042 |
| 3 | 9.622 | 20.31 | 1.18 | 1604 | 7.06 | 12.52 | 0.70 | 1050 | 10 | 2654 | 1180 | 866 |
| 4 | 0.026 | 4.38 | 0.23 | 236 | 8.32 | 13.12 | 1.65 | 1149 | 5 | 1385 | 3 | 1020 |
| 5 | 0.023 | 4.33 | 0.23 | 233 | 5.54 | 7.64 | 1.65 | 706 | 3.33 | 940 | 3 | 679 |

The embodiments of the invention in which an exclusive property of privilege is claimed are defined as follows:

1. A system for detritiating heavy water comprising:
   a remote site enrichment plant for producing, by combined electrolysis and catalytic exchange, an enriched stream of $DT/D_2$ gas from a tritium rich heavy water feed;
   a hydriding unit at the remote site for forming a hydride of said $DT/D_2$ gas for transportation to a central site;
   a de-hydriding unit at the central site for re-forming said $DT/D_2$ gas;
   a cryogenic distillation plant for forming a tritium gas stream from the $DT/D_2$ at a central site; and,
   a central site enrichment plant for producing, by combined electrolysis and catalytic exchange, an enriched stream of $DT/D_2$ gas for the cryogenic distillation plant and tritium lean heavy water for return to the remote site.

2. A system as is claim 1 where the cryogenic distillation plant strips around of the tritium in the $DT/D_2$ gas.

3. A system as claimed in claim 1 where the remote site enrichment plant deploys up to 93% of the electrolysis capacity.

4. A system as claimed in claim 1 where the number of remote site enrichment plants is greater than 1 and each remote site enrichment plant is geographically separate from each other.

5. A system as claimed in claim 1 where enrichment of tritium relative to deuterium is 3–10 fold from the feed water to the $DT/D_2$ gas formed as a metal hydride.

6. An apparatus for detritiating tritium rich heavy water from a nuclear reactor, having at least one remote site component associated with a central site component, wherein the remote site component comprises:
   a remote site enrichment plant adapted to operate on said heavy water for producing tritium enriched $DT/D_2$ gas;
   a hydriding unit interconnected with said enrichment plant for receiving and forming a hydride of said tritium enriched $DT/D_2$ gas for transportation of said hydride to said associated central site component,
and wherein the central site component comprises:
   a de-hydriding unit adapted to receive a hydride of tritium enriched $DT/D_2$ hydride transported from the remote site component, and reforming said tritium enriched $DT/D_2$ gas; and
   a cryogenic distillation plant for separating tritium gas from said tritium enriched $DT/D_2$ gas.

7. An apparatus as claimed in claim 6 wherein the remote site enrichment plant further produces tritium lean heavy water.

8. An apparatus as claimed in claim 6 wherein the remote site enrichment plant utilizes a combined electrolysis and catalytic exchange apparatus for producing tritium rich $DT/D_2$ gas.

9. An apparatus as claimed in claim 8 wherein the combined electrolysis and catalytic exchange apparatus comprises an isotope exchange column, an electrolysis unit and a recombiner unit.

10. An apparatus as claimed in claim 6 wherein the central site component includes a central combined electrolysis and catalytic exchange plant adapted to receive tritium lean $DT/D_2$ gas from the cryogenic distillation plant whereby said combined electrolysis and catalytic exchange plant produces tritium rich $DT/D_2$ gas for return to the cryogenic distillation plant and tritium lean heavy water for transportation to the remote site component.

11. A process for detritiating heavy water comprising the steps of:
   at a remote site,
   a) receiving a feed of tritium rich heavy water from a source;
   b) producing a tritium rich $DT/D_2$ gas mixture and a tritium lean $DT/D_2$ gas mixture from said feed;
   c) forming tritium lean heavy water from said tritium lean $DT/D_2$ gas mixture for return to the source;
   d) forming a hydride of said tritium rich $DT/D_2$ gas mixture;
   e) transporting the hydride to a tritium extraction plant at a central site; and
   at the central site,
   f) reforming a tritium enriched $DT/D_2$ gas mixture from said hydride in a de-hydriding unit;
   g) separating tritium gas from said tritium rich $DT/D_2$ gas mixture by a central cryogenic distillation process;
   h) separating a tritium lean $DT/D_2$ gas mixture by the central cryogenic distillation process; and
   i) forming tritium lean heavy water from said tritium lean $DT/D_2$ gas mixture and transporting same to said source at the remote site.

12. A process as claimed in claim 11 wherein the remote site enrichment process is a combined electrolysis and catalytic exchange process.

13. A process as claimed in claim 11 wherein the tritium lean heavy water is returned to the remote site with a tritium concentration less than about 1 Ci/kg.

14. A process as claimed in claim 11 wherein the central cryogenic distillation process further comprises a central combined electrolysis and catalytic exchange process for producing tritium rich $DT/D_2$ gas for the cryogenic distillation plant and tritium lean heavy water for transportation to the remote site.

15. A process as claimed in claim 11 wherein the remote site process produces a tritium concentration of about 10–100 ppm in the tritium rich $DT/D_2$ gas mixture.

16. A process as claimed in claim 11 wherein the concentration of tritium in the feed for the remote site process is about 1–50 Ci/kg.

17. A process as claimed in claim 11 wherein the hydride is uranium deuteride.

18. A process as claimed in claim 11 wherein the uranium deuteride is loaded to about $UD_{2.8}$.

19. A process as claimed in claim 11 wherein tritium lean heavy water is returned to the remote site from the central site process at a tritium concentration of about 0.01–0.3 Ci/kg.

20. An apparatus located at geographically separated remote and central sites for detritiating heavy water comprising:
   at the remote site,
      a combined electrolysis and catalytic exchange (CECE) plant and hydriding unit, said CECE plant with remote isotope exchange column, remote electrolysis unit, and remote recombiner unit, said CECE plant having means for receiving tritium rich heavy water at a feed point intermediate the top and bottom of the remote isotope exchange column, having means for further enriching tritium relative to deuterium in said tritium rich heavy water below said feed point by an isotope exchange reaction over a wet-proofed catalyst from tritium rich $DT/D_2$ gas flowing countercurrent to said heavy water, having means for passing said tritium rich heavy water to the remote electrolysis unit to form said tritium rich $DT/D_2$ gas, having means for providing the remaining portion of said tritium rich $DT/D_2$ gas to said hydriding unit to form a hydride of said tritium rich $DT/D_2$ gas for transportation, and a portion of said tritium rich $DT/D_2$ gas to the bottom of the remote isotope exchange column to provide countercurrent flow to said heavy water, having means for passing tritium lean $DT/D_2$ gas from the top of said remote isotope exchange column to the remote recombiner unit to form tritium lean heavy water, having means for passing a portion of the tritium lean heavy water to the top of the remote isotope exchange column for the isotope exchange reaction and having means for removing the remaining portion of tritium lean heavy water from the remote CECE plant;
      means for transporting said hydride of said tritium rich $DT/D_2$ gas to the central site; and
   at the central site, a de-hydriding unit, a cryogenic distillation plant and a central CECE plant, the de-hydriding unit having means for re-forming said tritium rich $DT/D_2$ gas and means for passing said tritium rich $DT/D_2$ gas to the cryogenic distillation plant, the cryogenic distillation plant having means for receiving said $DT/D_2$ gas from the de-hydriding unit, means for forming tritium gas from the tritium rich $DT/D_2$ and means for passing the remaining tritium-lean $DT/D_2$ gas to the central CECE plant, said central CECE plant having a central isotope exchange column, central electrolysis unit, and central recombiner unit, the central CECE plant having means for receiving tritiated heavy water from a central reactor at a feed point in the central isotope exchange column, the central combined electrolysis and catalytic exchange plant having means for receiving tritium-lean $DT/D_2$ gas from the cryogenic distillation plant at a feed point intermediate the top and bottom of the central isotope exchange column, having means for further enriching tritium relative to deuterium in said tritium rich heavy water below said feed point by an isotope exchange reaction over a wet-proofed catalyst from tritium rich $DT/D_2$ gas flowing countercurrent to said heavy water, having means for passing said tritium rich heavy water to the central electrolysis unit to form said tritium rich $DT/D_2$ gas, having means for providing a portion of said tritium rich $DT/D_2$ gas to the cryogenic distillation plant and the remaining portion of said tritium rich $DT/D_2$ gas to said isotope exchange column to provide countercurrent flow to said heavy water, having means for passing tritium lean $DT/D_2$ gas from the top of said central isotope exchange column to the central recombiner unit to form tritium lean heavy water, having means for passing a portion of the tritium lean heavy water to the top of the central isotope exchange column for the isotope exchange reaction and having means for transporting the remaining portion of the tritium lean heavy water back to the remote site.

21. A process for detritiating heavy water operated at and between geographically separated remote and central sites, where the remote site has combined electrolysis and catalytic exchange (CECE) plant and hydriding unit, said remote CECE plant having a remote isotope exchange column, remote electrolysis unit, and remote recombiner unit, and where the central site has central CECE plant, cryogenic distillation plant and de-hydriding unit, said central CECE plant having a central isotope exchange column, central electrolysis unit and central recombiner unit, the process comprising the steps of:

at a remote site,
   a) receiving tritium rich heavy water from a remote reactor at a feed point in the remote isotope exchange column;
   b) enriching tritium relative to deuterium in said tritium rich heavy water below said feed point intermediate the top and bottom of an isotope exchange reaction over a wet-proofed catalyst from tritium rich $DT/D_2$ gas flowing countercurrent to said heavy water;
   c) passing said tritium rich heavy water to the remote electrolysis unit to form said tritium rich $DT/D_2$ gas;
   d) providing a portion of said tritium rich $DT/D_2$ gas to the remote hydriding unit to form a hydride of said $DT/D_2$ gas for transportation;
   e) passing the remaining portion of said tritium rich $DT/D_2$ gas to the remote isotope exchange column to provide countercurrent flow to said tritium rich heavy water;
   f) passing tritium lean $DT/D_2$ gas from the top of said remote isotope exchange column to the remote recombiner unit to form tritium lean heavy water;
   g) passing a portion of the tritium lean heavy water to the top of the remote isotope exchange column for the isotope exchange reaction;
   h) removing the remaining portion of the tritium lean heavy water from the remote CECE plant; and
   i) transporting the hydride of said tritium rich $DT/D_2$ gas to the central de-hydriding unit; and at the central site,
   j) re-forming said tritium rich $DT/D_2$ gas in the de-hydriding unit;
   k) passing the tritium rich $DT/D_2$ gas to the cryogenic distillation plant;
   l) forming tritium gas and tritium-lean $DT/D_2$ gas in the cryogenic distillation plant;
   m) removing the tritium gas from the cryogenic distillation plant;
   n) receiving the tritium-lean $DT/D_2$ from the cryogenic distillation plant at a feed point intermediate the top and bottom of the central isotope exchange column;
   o) receiving heavy water at the feed point in the central isotope exchange column;
   p) enriching tritium relative to deuterium in said heavy water below said feed point by an isotope exchange reaction over a wetproofed catalyst from tritium rich $DT/D_2$ gas flowing countercurrent to said heavy water;
   q) passing said tritium rich heavy water to the central electrolysis unit to form said tritium rich $DT/D_2$ gas;
   r) providing a portion of said tritium rich $DT/D_2$ gas to the cryogenic distillation plant;
   s) passing the remaining portion of said tritium rich $DT/D_2$ gas to the central isotope exchange column to provide countercurrent flow to said heavy water;
   t) passing tritium lean $DT/D_2$ gas from the top of said central isotope exchange column to the central recombiner unit to form tritium lean heavy water;
   u) passing a portion of the tritium lean heavy water to the top of the central isotope exchange column for the isotope exchange reaction; and
   v) removing the remaining portion of the tritium lean heavy water from the central CECE plant for transportation to the remote site.

* * * * *